United States Patent [19]
Green, Sr. et al.

[11] Patent Number: 6,122,482
[45] Date of Patent: *Sep. 19, 2000

[54] SATELLITE BROADCAST RECEIVING AND DISTRIBUTION SYSTEM

[75] Inventors: James A. Green, Sr.; Austin S. Coker, Jr., both of Tallahassee, Fla.

[73] Assignee: Global Communications, Inc., Tallahasee, Fla.

[ * ] Notice: This patent is subject to a terminal disclaimer.

[21] Appl. No.: 09/001,484

[22] Filed: Dec. 31, 1997

Related U.S. Application Data

[63] Continuation-in-part of application No. 08/838,677, Apr. 9, 1997, Pat. No. 5,805,975.

[51] Int. Cl.[7] .............................. H04H 1/00; H04B 7/185

[52] U.S. Cl. ........................................... 455/3.2; 455/12.1

[58] Field of Search .................................... 455/3.2, 12.1, 455/4.1, 427, 428, 14, 20, 22, 179.1

[56] References Cited

U.S. PATENT DOCUMENTS

| | | |
|---|---|---|
| 3,324,417 | 6/1967 | Garner . |
| 3,665,316 | 5/1972 | Jeffers . |
| 3,730,980 | 5/1973 | Kirk, Jr. . |

(List continued on next page.)

FOREIGN PATENT DOCUMENTS

| | | | |
|---|---|---|---|
| 3623581C1 | 4/1988 | Germany . | |
| 41 26 774 | 2/1993 | Germany . | |
| 4126774 | 2/1993 | Germany | ................................ 455/3.2 |
| 2-140022 | 11/1988 | Japan . | |
| 0309032 | 12/1988 | Japan . | |
| 2-140022 | 5/1990 | Japan | ..................................... 455/3.2 |
| 5-344014A | 12/1993 | Japan . | |
| 2119192A | 11/1983 | United Kingdom . | |

OTHER PUBLICATIONS

Konishi, et al., "Satellite Broadcasting," 89 *SMPTE Journal*, No. 3, pp. 162–166 (Mar. 1980), First Printed Dec. 1978.
Grant, "Direct Broadcast from Lower Power Satellites," 81 Proceedings of the IEEE International Conf. on Comm., pp. 26.1.1–16.1.5, (Jun. 1981).
Cooper, "How to Build a Satellite TV Receiver," *Radio Electronics* (1981).
Douville, "A 12–GHZ Low–Cost Earth Terminal for Direct TV Reception from Broadcast Satellites," IEEE Proceedings on Consumer Electronics (1977).
Jurgen, "Chasing Japan in the HDTV Race," 26 *IEEE Spectrum*, No. 10, pp. 26–30 (Oct. 1989).
Tannas Jr., "HDTV Displays in Japan: Projection–CRT Systems on Top," *IEEE Spectrum*, 0018–9235/89/1000–0031, pp. 31–33 (Oct. 1989).
Dinsel, "Die Verteilung von Fernseh–Satelliten–Signalen in Kabelnetzen," *Fernseh–Und Kino–Technik*, vol. 39, No. 1, Berlin, Germany, (Jan. 1985).

(List continued on next page.)

*Primary Examiner*—Nguyen Vo
*Attorney, Agent, or Firm*—Nixon & Vanderhye P.C.

[57] ABSTRACT

The present invention provides a satellite broadcast receiving and distribution system that will permit for the transmission of vertical and horizontal or left-hand circular and right-hand circular polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to standard frequencies so as to permit for signals to travel via existing wiring which the present day amplifiers can transport in buildings, high-rises, hospitals, and the like so that satellite broadcasting can be viewed by numerous individuals by way of a single satellite antenna.

39 Claims, 5 Drawing Sheets

U.S. PATENT DOCUMENTS

| | | |
|---|---|---|
| 3,936,594 | 2/1976 | Schubin et al. . |
| 4,023,104 | 5/1977 | Rheinfelder . |
| 4,066,966 | 1/1978 | Takeuchi et al. . |
| 4,130,801 | 12/1978 | Prygoff . |
| 4,183,054 | 1/1980 | Patisaul et al. . |
| 4,395,734 | 7/1983 | Rypkema . |
| 4,419,768 | 12/1983 | Yamashita et al. . |
| 4,429,418 | 1/1984 | Hooper . |
| 4,439,740 | 3/1984 | Harrington . |
| 4,484,218 | 11/1984 | Boland et al. . |
| 4,486,773 | 12/1984 | Okubo . |
| 4,509,198 | 4/1985 | Nagatomi . |
| 4,512,033 | 4/1985 | Schrock . |
| 4,513,315 | 4/1985 | Dekker et al. . |
| 4,527,136 | 7/1985 | Kamiya . |
| 4,530,008 | 7/1985 | McVoy . |
| 4,532,543 | 7/1985 | Groenewegen . |
| 4,538,174 | 8/1985 | Gargini et al. . |
| 4,538,175 | 8/1985 | Balbes et al. . |
| 4,542,300 | 9/1985 | Nagatomi . |
| 4,545,048 | 10/1985 | Hauk et al. . |
| 4,545,075 | 10/1985 | Miller et al. . |
| 4,556,988 | 12/1985 | Yoshisato . |
| 4,558,358 | 12/1985 | Onda . |
| 4,580,161 | 4/1986 | Petrus et al. . |
| 4,586,081 | 4/1986 | St. Arnuad et al. . |
| 4,592,093 | 5/1986 | Ouchi et al. . |
| 4,605,968 | 8/1986 | Hayashi . |
| 4,608,710 | 8/1986 | Sugiura . |
| 4,648,123 | 3/1987 | Schrock . |
| 4,677,686 | 6/1987 | Hustig et al. . |
| 4,709,418 | 11/1987 | Fox et al. . |
| 4,710,972 | 12/1987 | Hayashi et al. . |
| 4,761,825 | 8/1988 | Ma . |
| 4,761,827 | 8/1988 | Horton et al. . |
| 4,866,787 | 9/1989 | Olesen . |
| 4,901,367 | 2/1990 | Nicholson . |
| 5,045,823 | 9/1991 | Nichols, III . |
| 5,073,930 | 12/1991 | Green et al. . |
| 5,206,954 | 4/1993 | Inoue et al. . |
| 5,216,432 | 6/1993 | West . |
| 5,225,799 | 7/1993 | West et al. . |
| 5,276,904 | 1/1994 | Mutzig et al. . |
| 5,301,352 | 4/1994 | Nagagawa et al. . |
| 5,303,403 | 4/1994 | Leong . |
| 5,331,332 | 7/1994 | West et al. . |
| 5,345,591 | 9/1994 | Tsurumaki et al. . |
| 5,437,051 | 7/1995 | Oto . |
| 5,440,319 | 8/1995 | Raymond et al. . |
| 5,463,407 | 10/1995 | West et al. . |
| 5,488,659 | 1/1996 | Miliani . |
| 5,666,126 | 9/1997 | Lange . |
| 5,682,426 | 10/1997 | Miliani et al. . |
| 5,737,698 | 4/1998 | Gabrelian et al. . |
| 5,752,180 | 5/1998 | Guo et al. ............................... 455/3.2 |
| 5,793,258 | 8/1998 | Lange . |
| 5,805,975 | 9/1998 | Green, Sr. et al. .................... 455/12.1 |
| 5,898,455 | 4/1999 | Barakat et al. . |

OTHER PUBLICATIONS

Brücke zum Kunden, Neue UKW–Kanalumsetzer übertragen viele Programme in bester Stereo–Qualität für grosse Germeinschafts–Antennenanlagen, Eckar Germany (1973).

Mussino, "Reception and Distribution Techniques for DBS Signals in Community Antenna Installations," *Alta Frequenza*, vol. 55, No. 2, Milano Italy (Apr. 1986).

"Broadband Communication Agile Processor 362HL," cadco Inc., 1990 Catalog, 6 pages.

White Papers, "SDTV Satellite Distribution Television System for Multiple Dwelling Units," www.foxcom.com, 6 pages (©1997–1999).

Foxcom, "About Us," 2 pages (©1997–1999).

Baylin, "Digital Satellite TV" (5th Ed. 1997), pp. 92–93 and 159–163.

U.S. Provisional Application Serial No. 60/068,589 filed Dec. 23, 1997.

"Private Cable Update" Dec. 1997.

Shrader, Robert L., *Electronic Communication*, Fifth Edition, p. 398.

SATELLITE BROADCAST RECEIVING AND DISTRIBUTION SYSTEM

This is a Continuation-In-Part of application Ser. No. 08/838,677, filed Apr. 9, 1997, now U.S. Pat. No. 5,805,975.

BACKGROUND OF THE INVENTION

1. Field of the Invention

The present invention relates generally to a satellite broadcasting receiving and distribution system and more particularly to a broadcasting receiving and distribution system that will allow for the transmission of vertical and horizontal signals or left-hand circular and right-hand circular polarization signals to be transmitted simultaneously via a single coaxial cable or optical fiber.

2. Description of the Prior Art

Satellite broadcasting has become very popular throughout the United States. Conventionally, broadcast signals are transmitted through an artificial satellite at very high frequencies. These frequencies are generally amplified and are processed by a particular device after being received by an antenna or antennas and prior to application to a conventional home television set or the like.

Typically, broadcasting systems comprise an outdoor unit, generally associated with the antenna, and an indoor unit, generally associated with the television set, or the like. Both units, indoor and outdoor, are coupled via a coaxial cable or fiber optic pathway.

A problem associated with these types of systems is that they are designed to accept signals through a line of sight. Accordingly, if the satellite is not visual from a building, then the satellite signal cannot be received. Thus, these systems are often rendered useless for high-rises, hospitals, schools, and, the like. These systems are limited in usage, and as such, can only be utilized in residential homes.

As an example, U.S. Pat. No. 5,301,352, issued to Nakagawa et al. discloses a satellite broadcast receiving system. The system of Nakagawa et al. includes a plurality of antennas which, respectively, include a plurality of output terminals. A change-over divider is connected to the plurality of antennas and includes a plurality of output terminals. A plurality of receivers are attached to the change-over divider for selecting one of the antennas. Though this system does achieve one of its objects by providing for a simplified satellite system, it does, however, suffer a major short coming by not providing a means of receiving satellite broadcasting for individuals who are not in the direct line of sight to the antennas. This system is silent to the means of simultaneously transmitting vertical and horizontal polarized signals via a single coaxial cable.

U.S. Pat. No. 5,206,954, issued to Inoue et al. and U.S. Pat. No. 4,509,198 issued to Nagatomi disclose satellite systems that include an outdoor unit that is connected to a channel selector. The satellite signal receiving apparatus receives vertically and horizontally polarized radiation signals at the site of a receiving antenna. The signals are then transmitted, selectively, to provide for either one of the vertically or horizontally polarized signals to be transferred. Hence, utilizing a switch allows for only one polarity to be transmitted. This design and configuration provides for one coaxial cable to be utilized, but does not provide for the vertical and horizontal signals to be transmitted simultaneously, but rather, selectively. This system selectively transmits the desired signals and polarities.

Systems have been attempted for transferring two frequencies on the same co-axial cable. Frequencies of the same polarity can easily be transmitted via a single co-axial cable, however, transmitting two signals, from two sources, each of different polarities can be a challenge. In some satellite configuration systems, once a timing diagram is plotted for the signals to be transmitted, it is seen that a forbidden path occurs between frequencies of 950 MHz and 1070 MHz: inherently prohibiting the frequencies within that range from being transmitted successfully. Hence, it is desirable to obtain a system which will not allow for conversion to occur at frequencies of the forbidden conversion.

As seen in German Patent Number DE4126774-A1, signals can fall within the range of the forbidden path, thereby providing for a non-working system. Additionally, this arrangement like the assembly disclosed in Japanese Application No. 63-293399 provides a system which receives a single signal and demultiplexes them into vertical and horizontal polarized signals. These systems, are complex and require a numerous amount of components in order to employ the invention. This increase in components will inherently cause an increase in component failure.

Accordingly, it is seen that none of these previous efforts provide the benefits intended with the present invention, such as providing a broadcasting receiving and distribution system that will allow for the transmission of vertical and horizontal or left-hand circular and right-hand circular polarization signals to be transmitted successfully and simultaneously via a single coaxial cable or optical fiber. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available materials.

SUMMARY OF THE INVENTION

The present invention provides a satellite broadcast receiving and distribution system that will permit for the transmission of vertical and horizontal or left-hand circular and right-hand circular polarization signals simultaneously via a single coaxial cable or optical fiber. The system of the present invention will accommodate two different polarity commands from two or more different sources at the same time. This satellite broadcast receiving and distribution system of the present invention will provide for the signals received from the satellite to be converted to standard frequencies so as to permit for signals to travel via existing wiring which the present day amplifiers can transport in buildings, high-rises, hospitals, and the like, so that satellite broadcasting can be viewed by numerous individuals by way of a single satellite antenna.

The satellite preferred embodiment broadcast system of the present invention comprises a satellite antenna which receives the polarized signals, a head-in frequency processor for converting the polarized signals, a single co-axial cable for transmitting the converted signal or, optionally, fiber optics can be utilized, a head-out receiver processor for re-converting the signals to their original frequency and polarity, and a source, which receives the signals in their respective original frequency and polarity. Structurally, the head-in frequency processor is coupled to the head-out receiver processor via the single co-axial cable, optionally, fiber optics can be utilized. The source is coupled to the head-out receiver processor.

Hence, to allow for successful conversion, the head-in processor converts the received signals of two different polarities to frequencies which permit for transmission simultaneously. The head-in processor will also accommodate two different polarity commands from two or more different sources at the same time via the single cable or the use of fiber optics.

The single cable, or the singular optical fiber, couples the head-in processor to the head-out processor. Once in the head-out processor, the signals are re-converted to their original state for transmission to the source (i.e. television).

Accordingly, it is the object of the present invention to provide for a satellite broadcast receiving and distribution system which will overcome the deficiencies, shortcomings, and drawbacks of prior satellite broadcast systems and signals and polarity transfer methods.

It is another object of the present invention to provide for a satellite broadcast receiving and distribution system that will convert different frequencies and different polarized signals in order to permit the signals to be transmitted via a single coaxial cable or, optionally, utilizing a single line fiber optic system.

Another object of the present invention is to provide for a satellite broadcast receiving and distribution system that will provide service to mid/high-rise office buildings, condominiums, schools, hospitals and the like via a single satellite.

Still another object of the present invention, to be specifically enumerated herein, is to provide a satellite broadcast receiving and distribution system in accordance with the preceding objects and which will conform to conventional forms of manufacture, be of simple construction and easy to use so as to provide a system that would be economically feasible, long lasting and relatively trouble free in operation.

Although there have been many inventions related to satellite broadcast receiving and distribution systems, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1A:
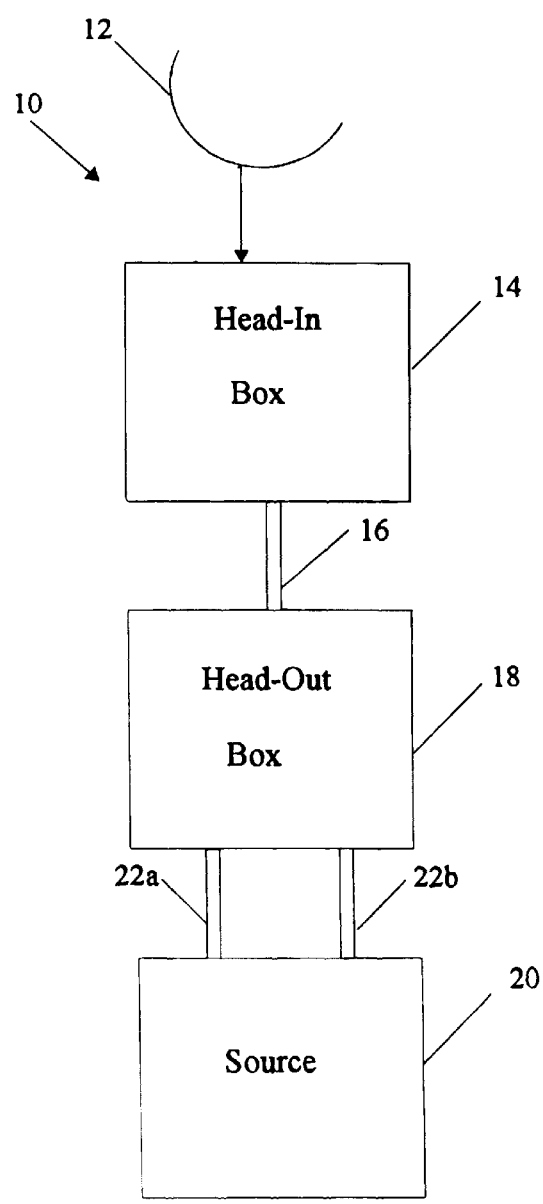
FIG. 1a is a block diagram illustrating the components used for the satellite broadcast receiving and distribution system according to a preferred embodiment of the present invention.

With reference to the drawings, in particular to FIG. 1a, the present invention, a satellite broadcasting receiving and distribution system, denoted by reference numeral 10, will be described. As illustrated in FIG. 1a, the satellite dish antenna system 10 of the present invention includes a receiving satellite 12 that will provide signals (Vertical-polarized signals and Horizontal-polarized signals or left-hand circular and right-hand circular polarization signals) received from a satellite to a head-in equipment frequency processor 14, also known as the head-in box. It is at this head-in equipment frequency processor or head-in box 14 where the signals are received simultaneously and then transmitted via a single coaxial cable 16 to the head-out receiver processor 18, also known as the head-out box. The head-in box 14 will enable for the single coaxial cable 16 to transmit signals of two different polarities and frequencies simultaneously. From the head-out frequency processor or head-out box 16 the signals are reconverted to their original state and then transmitted to a "source" (which may be a television for example) 20. As seen in FIG. 1a, the two different polarities (Vertical-polarized signals and Horizontal-polarized signals or left-hand circular and right-hand circular polarization signals) are transported to the source 20 via separate cables 22a and 22b, respectively.

Figure 1B:
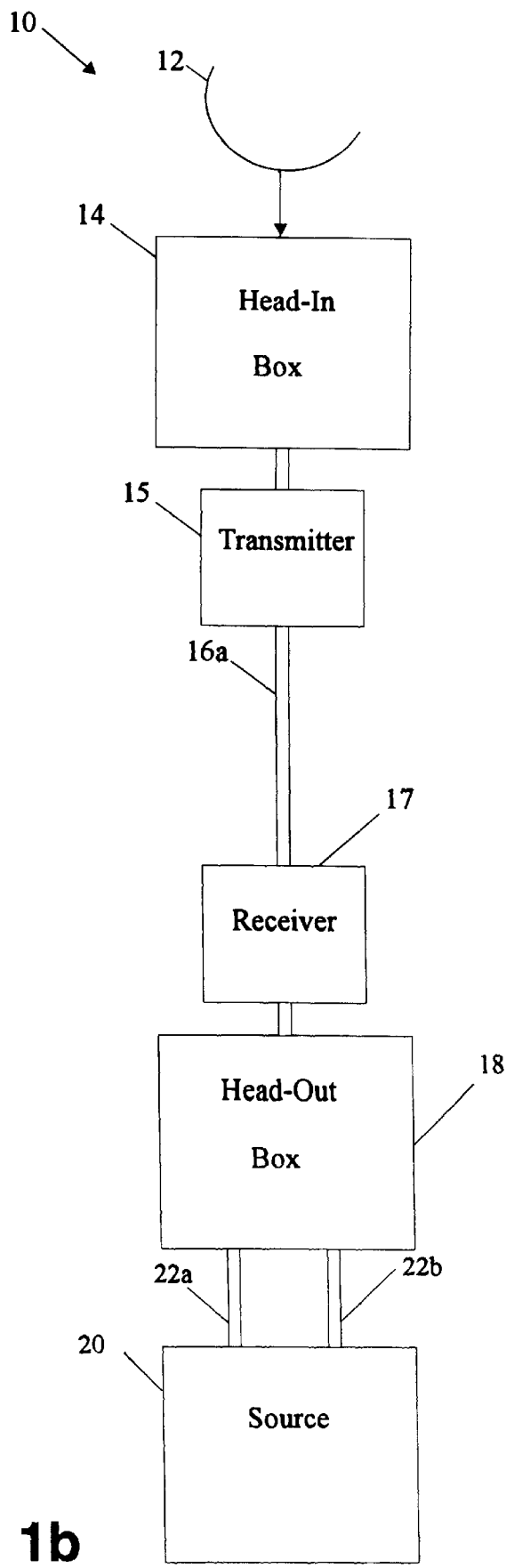
FIG. 1b is a block diagram illustrating the components used in the satellite broadcast receiving and distribution system of a preferred embodiment of the present invention, when a fiber optic cable is used.

Optionally, to enhance transportion of the signals and possibly reduce damage to the system, fiber optics can be used in place of the trunk cables or wiring, such as trunk wire 16, illustrates in FIG. 1a. This alteration is illustrated in FIG. 1b. As seen in this FIG., the satellite broadcasting receiving and distribution system 10 includes the head-in box 14. Coupled to the head-in box 14 is a transmitter 15. The fiber optic cable 16a is coupled to the transmitter 15. Located on the opposite end of the fiber optic cable is the receiver 17. Using the transmitter and the receiver enables the signals to be transmitted successfully via the fiber optic cable 16a. Consequently, the transmitter and receiver provides a means of transmitting via the fiber optic cable 16a. The use of fiber optic may produce favorable results.

The design and configuration and use of the transmitting means will provide for any one, a selective few, or all of the trunk wiring to be replaced by fiber optics. Allowing such a configuration will permit for a unit to be customized to the consumer/user.

Figure 2:
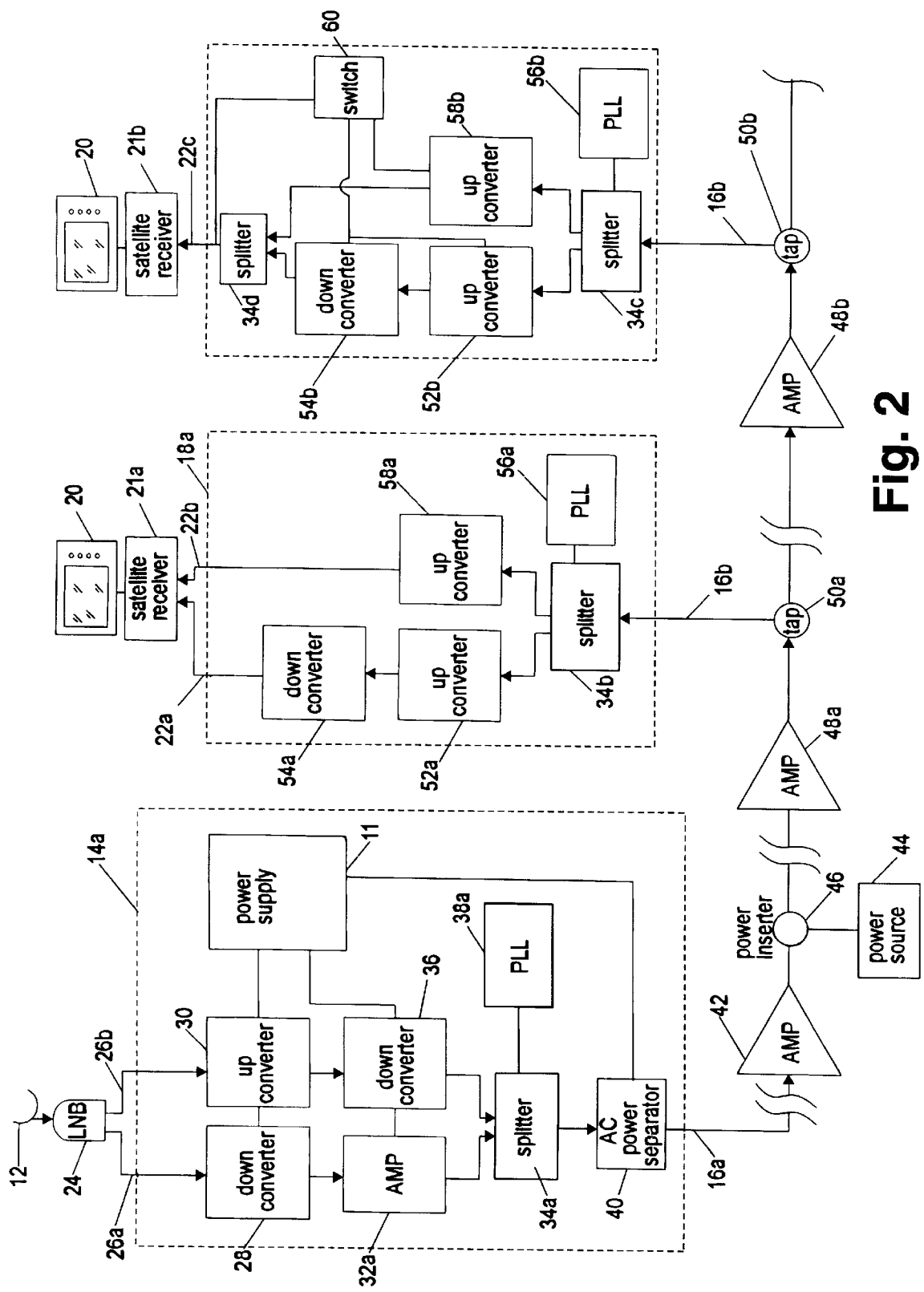
FIG. 2 is a block diagram representing a first embodiment of the head-in frequency processor and two embodiments of the head-out frequency processor used for the satellite broadcast receiving and distribution system according to a preferred embodiment of the present invention.

The system of the present invention includes separate embodiments, and the first embodiment is illustrated in FIG. 2. As seen in the first embodiment of the present invention 10a, there is shown a head-in frequency processor 14a couple to either a first head-out frequency processor 18a or a second head-out frequency processor 18b.

It is noted that FIG. 2 illustrated the head-in processor 14a to be coupled to two separate head-out processors 18a and 18b, respectively. This is shown for illustrative purposes only. In actuality, only one head-out receiver processor is utilized with the head-in processor 14a. The type and embodiment used for the head-out receiver processor is dependent to the combination of the satellite receiver and source that is utilized.

As seen in FIG. 2, the head-in equipment frequency processor 14a will receive two signals of two separate polarities and convert them to separate frequencies for enabling transmission via a single coaxial cable 16a or the use of fiber optics.

A low-noise block converter (LNB) 24 will receive the signals from the satellite 12. This LNB 24 is conventional and is used for amplifying the respective polarized signals (Vertical-polarized signals and Horizontal-polarized signals or left-hand circular and right-hand circular polarization signals). Accordingly, after signals are received, they pass through the low-noise block converter 24, to provide for the signals to enter the head-in equipment frequency processor 14a (illustrated in FIG. 2 as dashed lines) via conduit or fiber optics 26a and 26b, respectively.

The head-in equipment frequency processor 14a, illustrated in FIG. 2, provides for the signals to be converted, via converters 28 and 30, to the frequencies which the present day amplifiers can transport. In this stage of the system, the object is to convert the signals of one polarity up (via converter 30) and to convert the signals of second polarization down (via converter 28). This will render the converted signals to be transmitted without emerging into the forbidden frequency conversion.

From the conduit or fiber optics 26a and 26b, the signals are transmitted to a first converter or down converter 28 and a second converter or up converter 30. These frequency converters, 28 and 30, respectively, convert the entered frequencies to a frequency which present day amplifies can transport. The converters will be discussed in further detail in FIGS. 3a and 3b. The utilization of two converters permit for the acceptance of two signals or polarized transponders that are of a different frequency.

In the down converting means 28, the transponder is converted down to a specified frequency. The specified frequency is the frequency that is required for the present day amplifiers for transportation. The newly converted frequencies are amplified through the amplifying means 32a. At means 32a, the converted frequencies are amplified so not to create second harmonics. These signals are then transferred to a conventional four way splitter 34a.

In the up converting means 30, the transponders are converted up to a specified frequency. The converted frequencies then are converted down via a down converter 36. This process of converting up and then down provides for frequencies to be converted without difficulties and avoiding the forbidden conversion area.

The converted signals are transferred to the four way splitter 34a in order to combine the frequency of the amplified signal from amplifier 32a and frequency from converter 36. To synchronized the system, the frequencies from the phase lock loop (PLL) 38a are transmitted to the splitter 34a.

From the splitter 34a, the signals are passed through an AC power separator 40 which routes 60 Volts power to a DC power supply of 18 Volts. This will permit for the dual frequencies from the satellite dish 12 to be transmitted simultaneously via a single coaxial cable 16a or optionally, via fiber optics. In the fiber optic embodiment, the signals are transmitted simultaneously utilizing a single optical fiber.

Dependent upon the length of the cable, an optional conventional amplifier 42 can be coupled thereto. If fiber optics are used, the conventional amplifier can be eliminated. Power from a power source 44 is inserted into the lines via a power inserter 46. The signals are amplified, as needed, with additional amplifiers 48a, 48b. It is noted that the amplifiers are optional and are dependent on the distance that the head-in frequency processor 14a is located from the head-out frequency processor 18a or 18b. The power supply and power source 11 energize the head-in frequency processor 14a.

From the single coaxial cable 16a or fiber optic, the signals are adjusted via a tap 50a to permit for the appropriate decibels that are required for the head-out processor 18a or 18b.

The head-out frequency processor used for the head-in processor 14a illustrated in FIG. 1, can include two embodiments, dependent upon the embodiment for the source in combination with the satellite receiver.

The first embodiment for the head-out frequency processor is illustrated in FIG. 2 by way of dash line 18a. As seen in this embodiment, the simultaneously transmitted signals enter the processor via conduit 16b or fiber optic. The conduit or fiber optic 16b is coupled to a conventional four (4) way splitter 34b. The conduit or fiber optic 16b can be a fiber optic unit. This fiber optic unit is optional, yet will be beneficial to the unit by providing a system which is faster, safer, and which can prevent damage, vandalism or the like. A conventional phase lock loop (PLL) 56a is coupled to the splitter 34b to permit for the signals to be locked to the proper and desired frequencies. From the splitter 34b the first frequency is transmitted to a first converter 58a in order to permit for the signals or transponders to be converted up to a specified frequency. This up converted signal from the first converter or up converter 58a is then transmitted to the satellite receiver by way of a conduit or fiber optics 22b.

The second frequencies are transmitted to a first or up converter 52a and then are transported to a second or down converter 54a. This will permit for the signals to be converted to the desired frequency. This second or down converter is coupled to the satellite receiver 21 via conduit or fiber optic 22a. In this embodiment, the signals from down converter 54a and from up converter 58a are in the original state, both frequency and polarity, as when transmitted from the satellite to the head-in processor 14a, via lines 26a and 26b. Lines 26a and 26b can be either conventional wiring or optionally can be fiber optics. The re-converted signals, frequencies and polarity in their original state, are transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

It is noted that any of the electrical lines, used for coupling and transmitting the signals can be replaced by the use of fiber optics. This replacement may enhance the product for some applications.

Hence, it is seen that the head-in processor converted the signals to different frequencies to enable the transmission of two separate polarized signals via a single co-axial cable (or fiber optic) to a head-out processor. From the head-out processor, the signals are re-converted to their original state, which was received via lines 26a and 26b (or fiber optics). For example, with satellite systems, frequencies typically range between 950–1450 MHz. If the satellite transmits a frequency of 1450 MHz for both the horizontal and vertical polarities, then one of the polarities, such as horizontal, is converted down to 560 MHz via converter 28. The second frequency of the second polarity, such as vertical, is first converted up to 2010 MHz and then back down to 1070 MHz, via converters 30 and 36, respectively. Such a conversion allows for the two frequencies of two different polarities, 560 MHz (horizontal) and 1070 MHz (vertical), to be transmitted simultaneously on a single coaxial cable or fiber optic (16b).

As illustrated, this head-out frequency processor is the reverse process of the head-in processor. This is to provide for the signals to reconverted to its original frequencies so as to provide for the satellite receiver 21 and source 20 to accept the signals. The single cable or fiber optic 16b accepts the signals at frequencies different than that of the source and satellite receiver 21. Accordingly, the head-out processor must re-convert the signals to the frequencies that are utilized by the source 20.

An alteration of the satellite receiver requires an alteration in the head-out receiver processor. This alteration is illustrated in FIG. 2 and is shown in outline designated as reference 18b. In this design and configuration, the satellite receiver utilizes only one wire and accepts only one type of signal, selectively, such as only left-hand circular or only right hand circular polarized signals.

As seen, the frequencies are tapped via tap 50b. The tap 50b is coupled to the head-out processor 18b via line 16b which is connected to a four (4) way splitter 34c. To provide for the signals to be locked in proper frequencies, the four way splitter is coupled to a phase lock loop (PLL) 56b.

From the splitter 34c, the first signal of a first polarity is transmitted to a first or up converter 52b and then is transmitted to a second or down converter 54b. The conversion of the signals from up to down provides the benefit of converting the frequency without any mishap or error. This method of conversion will avoid the forbidden conversion area as well as provide for the original received frequency and polarity of the signals.

The signals of the second frequency and second polarity are transmitted to an up converter 58b which will inherently convert the signals to its original received frequency while maintaining its polarity. A polarity switch 60 is connected to converters 52b, 54b, and 58b for coupling the head-out processor to the satellite receiver via a single cable or fiber optic 22c and a joining means, which is a four way splitter 34d. The satellite receiver 21 is connected by way of a line (illustrated, but not labeled) to a source 20. In this embodiment, the switch 60 is used to determine which polarity will enter into the head-out processor 18b.

Figure 3A:
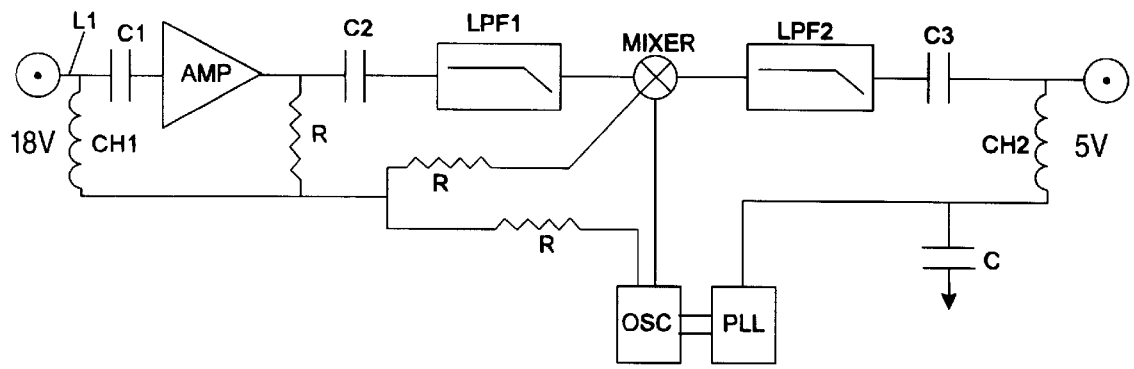
FIG. 3a is a schematic diagram of the down converter used for the satellite broadcast signal receiving and distribution system according to a preferred embodiment of the present invention.

In the embodiments shown above, the satellite receiver 21 and source 20 are conventional components and as such, their schematics are not shown in further detail. The up and down converters used in the embodiment above will be discussed in further detail in FIGS. 3a and FIG. 3b. FIG. 3a represents the schematic rendering of the down converters (28, 36, 54a, and 54b) and FIG. 3b represents the schematic rendering of the up converters (30, 52a, 52b, 58a, and 56b).

As seen in the schematic diagram of FIG. 3a, the signal enters the down converter via line L1. The entered signal passes through a first capacitor C1 which is coupled to an amplifier AMP. After passing the amplifier AMP, the signal passes a second capacitor C2 before entering a first low pass filter LPF1. This first LPF1 is coupled to a mixer which is coupled to a second LPF2. This second LPF2 is connected to a third capacitor C3 which is coupled to a second choke CH2. The mixer is also connected to an oscillator OSC. The oscillator is coupled to a PLL. The first capacitor C1 is also connect to a first choke CH1. Capacitors C, C1, C2, C3 are coupled to the amplifier, oscillator, phase lock loop PPL, and the second low pass filter. Resistors are coupled to the amplifier, oscillator, first low pass filter and mixer. Chokes are also coupled in series with capacitors to provide for the chokes to be parallel with the amplifier AMP and the second low pass filter, respectively. As seen the chokes CH1 and CH2 (inductors) and capacitors C are a DC bypass filter network and provide a DC path that enables passing DC power to the antenna electronics.

Figure 3B:
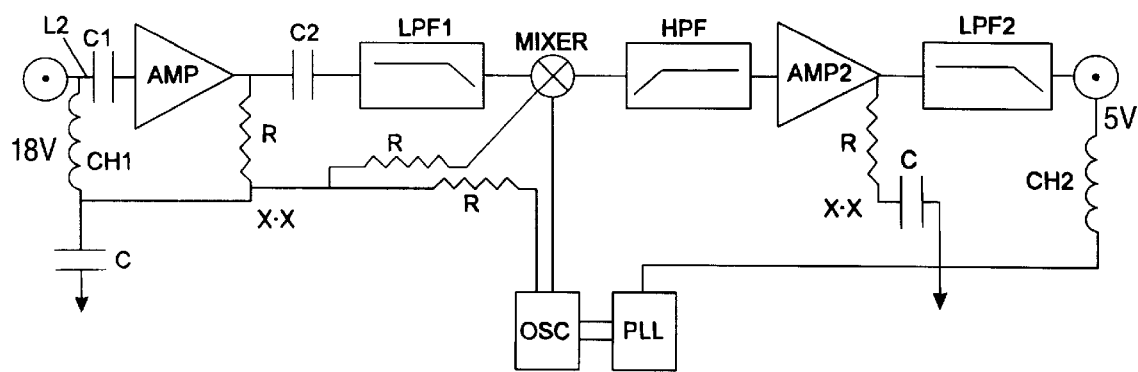
FIG. 3b is a schematic diagram of the up converter used for the satellite broadcast signal receiving and distribution system according to a preferred embodiment of the present invention.

The up converter is disclosed in FIG. 3b. As seen in this drawings, the signal enters the up converter via a first line L2. The converter further includes an amplifier AMP that is coupled to a first low pass filter LP1. The amplifier is also coupled to an oscillator OSC. The oscillator and the first low pass filter are connect to a mixer. This mixer is coupled to a high pass filter HPF. The oscillator is also connected with a phase lock loop PLL. A second amplifier AMP2 is coupled to the high pass filter HPF. A second low pass filter LPF2 is coupled to the second amplifier. Capacitors are coupled to the first amplifier, first lower pass filter, and the amplifier. Resistors R are coupled the first and second amplifiers, oscillator, first low pass filter, and mixer. Chokes are also used in this circuit. The first choke is coupled to a capacitor which is coupled to the first amplifier. The second choke is coupled to the phase lock loop.

Figure 4:
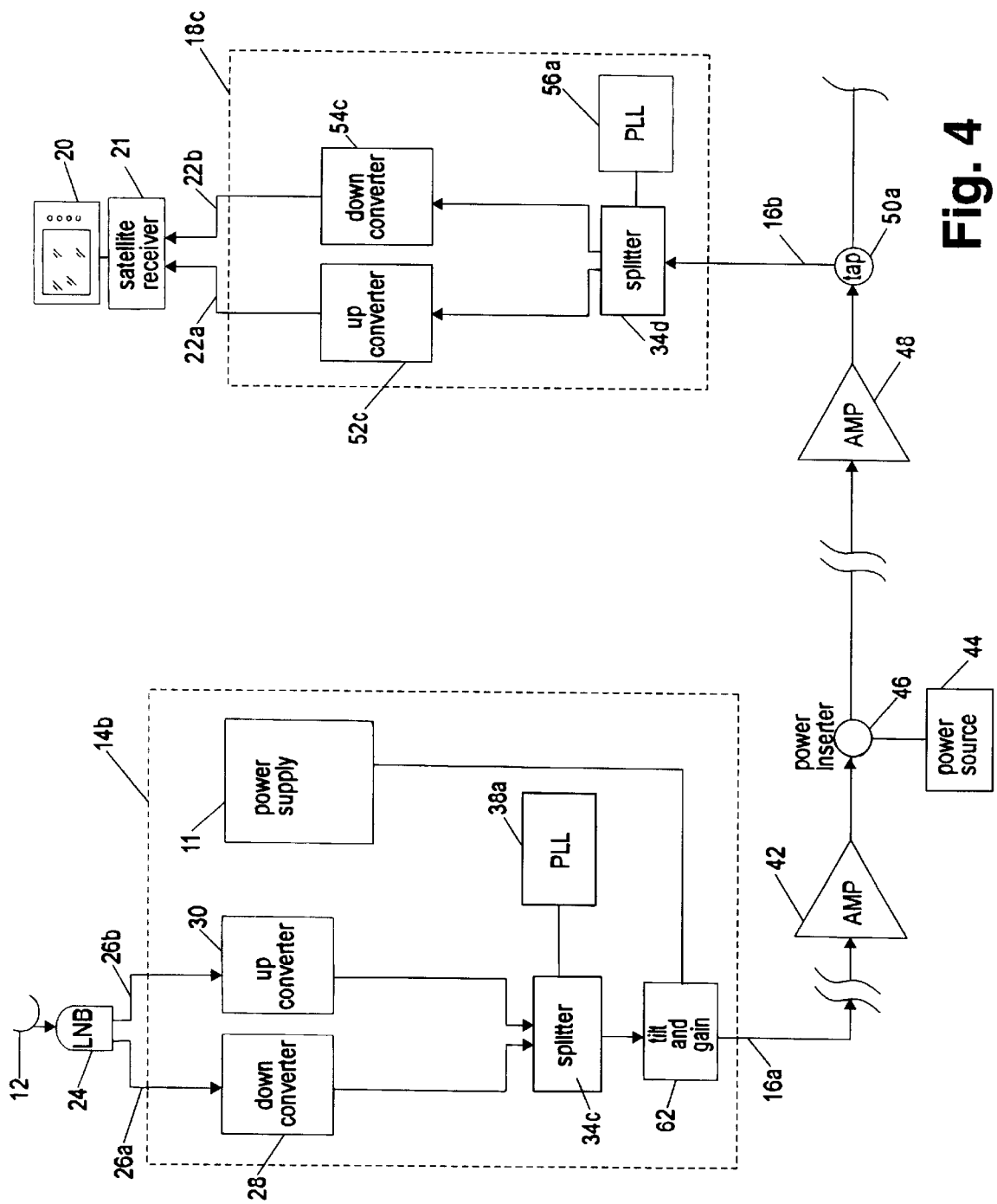
FIG. 4 is a block diagram of the second embodiment of the satellite broadcast signal receiving and distribution system according to a preferred embodiment of the present invention.

Simplifying the head-out processor described above, will provide another embodiment for the satellite broadcast receiving and distribution system. This system is illustrated in further detail in FIG. 4. This embodiment simplifies the above described embodiments and also provides a device which avoids the forbidden path. Alteration for this embodiment occurs in the head-in equipment frequency processor 14b and the head-out frequency processor 18c.

As with the first embodiment, a low-noise block converter (LNB) 24 will receive the signals from the satellite antenna 12. This LNB 24, as stated previously, is conventional and is used for amplifying the respective polarized signals (Vertical-polarized signals and Horizontal-polarized signals or left-hand circular and right-hand circular polarization signals). Hence, after signals are received, they pass through the low-noise block converter 24, to provide for the signals to enter the head-in equipment frequency processor 14b (illustrated in FIG. 4 as dashed lines) via conduits 26a and 26b, respectively or optionally via fiber optics.

The head-in equipment frequency processor 14b, provides for the signals to be converted, via converters 28 and 30, as identified for the first embodiment, thereby providing a system which includes frequencies that the present day amplifiers can transport. In this stage of the system, the object is to convert the signals of one polarity up (via converter 30) and to convert the signals of second polarization down (via converter 28).

From the conduit or fiber optics 26a and 26b, the signals are transmitted to a first converter or down converter 28 and a second converter or up converter 30. These frequency converters, 28 and 30, respectively, convert the entered frequencies to a frequency which present day amplifies can transport. The converters have been discussed in further detail in FIGS. 3a and 3b. The utilization of two converters permit for the acceptance of two signals or polarized transponders that are of a different frequency.

In the down converting means 28, the transponder is converted down to a specified frequency. The specified frequency is the frequency that is required for the present day amplifiers for transportation. Though not illustrated, the newly converted frequencies are amplified through the amplifying means, as illustrated in FIG. 2 via element 32a. At the amplifying means 32, the converted frequencies are amplified so not to create second harmonics. These signals are then transferred to a conventional two-way splitter 34c.

In the up converting means 30, the transponders are converted up to a specified frequency. The converted signals are transferred to the two-way splitter 34c in order to combine the frequency of the amplified signals. To synchronize the system, the frequencies from the phase lock loop (PLL) 38a are transmitted to the splitter 34c.

From the splitter 34c, the signals are passed through a conventional tilt and gain 62. This will permit for the dual frequencies from the satellite dish 12 to be transmitted simultaneously via a single coaxial cable or fiber optic 16a. Dependent upon the length of the cable or fiber optic, an optional conventional amplifier 42 can be coupled thereto. Power from a power source 44 is inserted into the lines via a power inserter 46. The signals are amplified, as needed, with additional amplifiers 48. It is noted that the amplifiers are optional and are dependent on the distance that the head-in frequency processor 14b is located from the head-out frequency processor 18c. The power supply and power source 11 energize the head-in frequency processor 14b.

From the single coaxial cable or fiber optic 16a, the signals are adjusted via a tap 50a to permit for the appropriate decibels that are required for the head-out processor 18c.

The head-out frequency processor used for the head-in processor 14b is illustrated in by way of dash line 18c. As seen in this embodiment, the simultaneously transmitted signals enter the processor via conduit or fiber optic 16b. The conduit or fiber optic 16b is coupled to a conventional two (2) way splitter 34d. A conventional phase lock loop (PLL) 56a is coupled to the splitter 34d to permit for the signals to be locked to the proper and desired frequencies. From the splitter 34d the first frequency is transmitted to a first converter 52c in order to permit for the signals or transponders to be converted up to a specified frequency. The converted signals from the first converter or up converter 52c are then transmitted to the satellite receiver by way of a conduit or fiber optic 22a.

The second frequencies are transmitted to a down converter 54c. This will permit for the signals to be converted to the desired frequency. This second or down converter is coupled to the satellite receiver 21 via conduit or fiber optic 22b. The signals from down converter 54c and from up converter 52c are in the original state, both frequency and polarity, as when transmitted from the satellite antenna 12 to the head-in processor 14b, via lines 26a and 26b. The re-converted signals, frequencies and polarity in its original state, are transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

Hence, it is seen that the head-in processor 146 converts the signals to different frequencies to enable the transmission of two separate polarized signals via a single coaxial cable or fiber optic to a head-out processor 18c. From the head-out processor 18c, the signals are re-converted to their original state, which was received via lines 26a and 26b. The above identified embodiment is ideal for long distant use, i.e. exceeding 1000 feet. However, for shorter distance, i.e. less than 1000 feet, the components can be simplified again to provide for a device which is ideal for use in apartments or the like.

Figure 5:
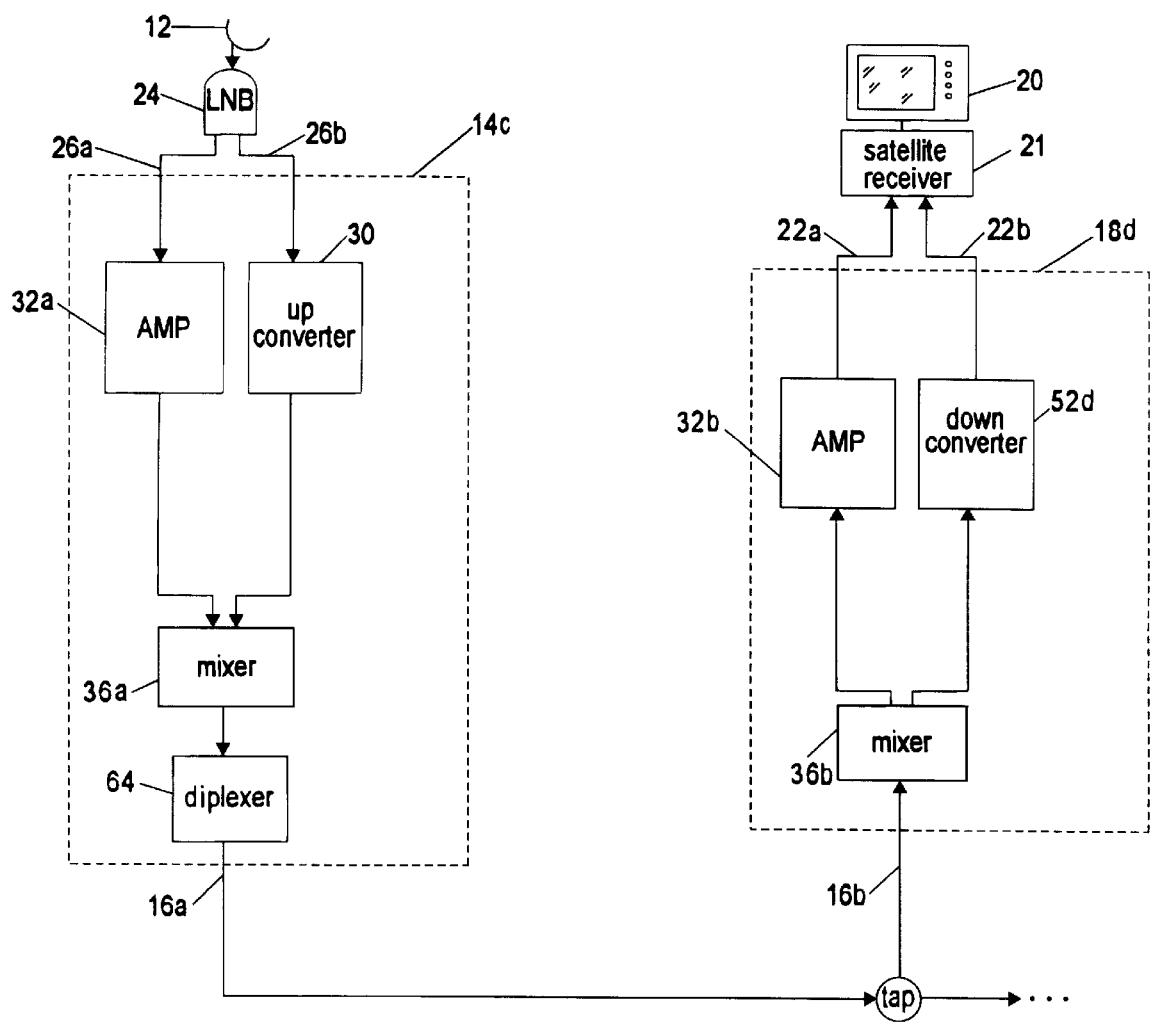
FIG. 5 is a block diagram of the third embodiment of the satellite broadcast signal receiving and distribution system according to a preferred embodiment of the present invention.

As seen in FIG. 5, the present invention includes the head-in equipment frequency processor 14c and the head-out frequency processor 18d.

As with the previous embodiments, a low-noise block converter (LNB) 24 will receive the signals from the satellite 12. This LNB 24, as stated previously, is conventional and is used for amplifying the respective polarized signals (Vertical-polarized signals and Horizontal-polarized signals or left-hand circular and right-hand circular polarization signals). Hence, after signals are received, they pass through the low-noise block converter 24, to provide for the signals to enter the head-in equipment frequency processor 14c (illustrated in FIG. 5 as dashed lines) via conduit or fiber optics 26a and 26b, respectively.

As seen, this head-in equipment frequency processor 14c is simplified. The head-in equipment frequency processor 14c, provides for signals of one frequency to be converted, up via converter 30, as identified for the first embodiment, thereby providing a system which includes frequencies that the present day amplifiers can transport. In this stage of the system, the object is to convert the signals of one polarity up (via converter 30). The signal of the second polarity is amplified via conventional amplifier 32a.

From the conduit or fiber optics 26a and 26b, the signals are transmitted to a first converter or up converter 30 and a amplifier 32b. The down converters have been discussed in further detail in FIG. 3a.

From the amplifier and up converter, the signals are transferred to a conventional hybrid mixer 36. From the mixer, the signals pass a diplexer 64. Signals exit the diplexer 64 via a single coaxial cable or fiber optic 16a.

From the single coaxial cable or fiber optic 16a, the signals can be adjusted via a tap 50c to permit for the appropriate decibels that are required for the head-out processor 18d.

The head-out frequency processor used for the head-in processor 14c is illustrated in by way of dash line 18d. As seen in this embodiment, the simultaneously transmitted signals enter the processor via conduit or fiber optic 16b. The conduit or fiber optic 16b is coupled to a conventional mixer 36b. From the mixer 36b the first frequency is transmitted to an amplifier 32b and the second frequency of a different polarity is transferred to a down converter 52d for converting the frequency to its original state.

The re-converted signals, frequencies and polarity in its original state, are transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

Hence, it is seen that the head-in processor 14c converts the signals to different frequency to enable the transmission of two separate polarized signals via a single co-axial cable or fiber optic to a head-out processor 18d. From the head-out processor 18d, the signals are re-converted to their original state, which was received via lines 26a and 26b.

The satellite system of the present invention will permit for two signals of different frequency and polarities to travel simultaneously via a single coaxial cable or optical fiber. The use of this will provide for a satellite system that is versatile, economical and compact. The usage of the single cable or optical fiber permits for a system that can accept satellite broadcasting in places that were previously impossible. These places include mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an embodiment thereof, it will be understood by those skilled in the art that various changes in form and detail may be made without departing form the spirit and scope of the invention.

We claim:

1. In a satellite receiving and distribution system that receives signals from at least one satellite and distributes said received signals over a cable to at least one remotely located satellite receiver having a frequency range and producing a control signal, said system including at least one satellite dish that receives, from the at least one satellite, a first block of polarized signals comprising, a first set of plural channels and a second block of polarized signals comprising a second set of plural channels, said system further comprising:

head-in equipment coupled to said satellite dish, said head-in equipment applying both said first polarized signal block and said second polarized signal block to said cable in different segments of the frequency spectrum such that said cable simultaneously carries both said first and second polarized signal blocks to said satellite receiver, said head-in equipment including a first block converter that frequency converts at least one of said first and second polarized signal blocks for application to said cable;

a second block converter coupled to said cable and located in proximity to said satellite receiver, said second block converter further frequency converting said frequency-converted polarized signal block to a frequency band within the receiving frequency range of said satellite receiver, wherein the output of the second block converter is a block of plural channels; and an electrically operated switch located with said satellite receiver and coupled between said second block converter and said satellite receiver, said switch operating to select between said first signal block and said second signal block for application to the satellite receiver in response to said control signal produced by said satellite receiver to enable said satellite receiver to receive any of the plural channels in the first and second sets.

2. A satellite system as in claim 1 wherein said cable comprises a single optical fiber, and first block converter provides for two different frequencies and polarities to be transmitted simultaneously via said single optical fiber.

3. A satellite system as in claim 2 wherein said second block converter frequency converts said first block of polarized signals or said second block of polarized signals to their original received frequency as applied to the first block converter.

4. A satellite system as in claim 1 wherein said satellite receiver is coupled to a television receiver.

5. A satellite system as in claim 1 wherein a power source is coupled to said first block converter and said power source powers said first block converter.

6. A satellite system as in claim 1 wherein said second block converter provides for said block of signals converted by said first block converter to be converted separately and independently to said satellite receiver.

7. A satellite system as in claim 1 wherein said switch comprises a polarity switch that selectively alternately couples said first signal block of a first polarity or said second signal block of a second polarity different from said first polarity to said satellite receiver.

8. A satellite system as in claim 1 wherein said first block converter includes a first converting circuit for converting said first block of signals to a desired first frequency band and a second converting circuit for converting said second block of signals to a desired second frequency band different from said first frequency band.

9. A satellite system as in claim 1 wherein said cable comprises an optical fiber coupled to said first block converter via a transmitter, said transmitter enabling said signals to be transmitted via said optical fiber, wherein said transmitter is located at a first end of said optical fiber and said system further includes a receiver located at a second end of said optical fiber.

10. A satellite system as in claim 1 wherein said first block converter includes a first converting circuit for converting said first block of signals to a first frequency band and a second converting circuit for converting said second block of signals to a second frequency band.

11. A system as in claim 1 wherein said first block converter includes a tilt and gain unit.

12. A system as in claim 1 wherein said first block converter includes a first converting circuit for converting said first block of signals to a first frequency band without further frequency converting said second block of signals.

13. A system as in claim 1 wherein said second block converter performs a reverse of the frequency conversion performed by said first block converter.

14. A system as in claim 1 wherein at least one amplifier is located between said first block converter and said second block converter.

15. A system as in claim 1 further including a low noise block converter disposed between said satellite dish and said head-in equipment.

16. A system as in claim 15 wherein said low noise block converter converts said first signal block and said second signal block before further conversion by said first block converter.

17. A system as in claim 16 wherein said head-in equipment passes one of said first and second signal blocks to said cable without any further frequency conversion.

18. A system as in claim 1 wherein said head-in equipment passes one of said first and second signal blocks to said cable without any further frequency conversion.

19. A system as in claim 1 wherein said second block converter down-converts to a lower frequency range.

20. A system as in claim 1 wherein said first block converter up-converts to a higher frequency.

21. A satellite distribution system for use with a satellite dish coupled to at least one satellite receiver via a single coaxial cable, said satellite receiver producing a control signal, said system comprising:

equipment coupled to said satellite dish, said equipment including a first frequency block converter that frequency converts at least one of a first block of polarization signals comprising a first set of plural channels and a second block of polarization signals comprising a second set of plural channels, said equipment applying both said first and second polarization signal blocks simultaneously to said single coaxial cable for enabling the two different polarization blocks to be transmitted simultaneously via said single coaxial cable; and a second frequency block converter coupled between said single coaxial cable and said satellite receiver, said second frequency block converter converting said one of said first polarization signal block and said second polarization signal block and applying said further frequency converted block of signals to said satellite receiver, wherein the output of the second block converter is a block of plural channels and wherein said system further includes an electrically operated switch coupled to said second frequency block converter and co-located with said satellite receiver, said switch operating to select between said first signal block and said second signal block for application to said satellite receiver in response to said control signal produced by said satellite receiver.

22. A satellite system as in claim 21 wherein said first block converter includes a first converting circuit for converting said first block of signals to a first frequency band and a second converting circuit for converting said second block of signals to a second frequency band that does not overlap said first frequency band.

23. A system as in claim 21 wherein said first block converter includes a tilt and gain unit.

24. A system as in claim 21 wherein said first block converter includes a first converting circuit for converting said first block of signals to a first frequency band without further frequency converting said second block of signals.

25. A system as in claim 21 wherein said second frequency block converter down-converts to a lower frequency range.

26. A system as in claim 21 wherein said first block converter up-converts to a higher frequency range.

27. In a satellite distribution system that distributes received satellite signals to satellite receiver equipment via a cable, said satellite receiver equipment producing a control signal, said system including head end equipment including a satellite antenna that receives, from at least one satellite, a first block of plural channels of a first polarization and a second block of plural channels of a second polarization different from said first polarization, said satellite distribution system further comprising:

components of said head end equipment that communicate said first and second channel blocks of different polarizations over said cable simultaneously, said head end equipment components including a first block converter that converts at least one of said first and second channel blocks from a first frequency band to a second frequency band and applies said frequency-converted channel block to said cable so that said first and second polarization channel blocks are frequency stacked onto the same cable; and components of said receiver equipment including a second block converter that further frequency converts said frequency-converted channel block so it can be decoded by said satellite equipment, wherein the output of the second block converter is a block of plural channels, said components of said receiver equipment further including an electrically operated polarity switch coupled to at least said second block converter, said polarity switch operating to select between said first channel block and said second channel block for application to said satellite receiver in response to said control signal produced by said satellite receiver.

28. A satellite receiving and distribution system as in claim 27 wherein said second block converter reconverts said frequency converted signal block back to said first frequency band.

29. A satellite receiving and distribution system as in claim 27 wherein said cable comprises a coaxial cable.

30. A satellite receiving and distribution system as in claim 27 wherein said cable comprises an optical fiber.

31. A satellite receiving and distribution system as in claim 27 wherein said system further comprises multiple satellite receivers each having a second frequency converter associated therewith, and said cable distributes said first and second channel blocks to each of said multiple satellite receivers.

32. A satellite receiving and distribution system as in claim 27 wherein said head end equipment further includes a low-noise block converter coupled between said satellite receiving antenna and said first block converter.

33. A satellite receiving and distribution system as in claim 27 wherein said first block converter includes an up-converter and said second block converter includes a down-converter.

34. A satellite receiving and distribution system as in claim 27 wherein said first and second block converters each operate to frequency convert both said first and second channel blocks.

35. A system as in clam 27 wherein said components of said receiver equipment down-convert.

36. A system as in claim 27 wherein said first block converter up-converts.

37. A method of distributing received satellite signals via a distribution cable to at least one subscriber's satellite receiver, said satellite receiver having a frequency range and being coupled to a second end of said distribution cable, said distribution cable also having a first end, said method comprising:

receiving, via a satellite dish, a first block of plural channels of a first polarization and a second block of plural channels of a second polarization different from said first polarization;

frequency converting at least said first channel block to a frequency band that is at least partially outside of the satellite receiver frequency range;

simultaneously applying said second channel block and said frequency-converted first channel block to the first end of said distribution cable;

at the second end of said cable, further frequency converting said first channel block to provide a block of plural channels within the frequency range of said satellite receiver; and switching, under control of said satellite receiver with an electrically operated switch located at the second end of said cable, between said first channel block and said second channel block for application to said satellite receiver.

38. A method as in claim 37 wherein said further frequency converting step includes down-converting said first channel block to a lower frequency range.

39. A method as in claim 37 wherein said step of frequency converting at least said first frequency block comprises up-converting said first frequency block to a higher frequency for application to said cable.

* * * * *

UNITED STATES PATENT AND TRADEMARK OFFICE
CERTIFICATE OF CORRECTION

PATENT NO. : 6,122,482
DATED : September 19, 2000
INVENTOR(S) : GREEN et al.

It is certified that error appears in the above-identified patent and that said Letters Patent is hereby corrected as shown below:

Title page:

[63] Continuation-in-part of application No. 08/838,677, Apr. 9, 1997, Pat. No. 5,805,975 which is a continuation-in-part of application No. 394,234, February 22, 1995.

Signed and Sealed this

First Day of May, 2001

NICHOLAS P. GODICI

Attest:

Attesting Officer  Acting Director of the United States Patent and Trademark Office

(12) EX PARTE REEXAMINATION CERTIFICATE (10595th)
United States Patent
Green, Sr. et al.

(10) Number: US 6,122,482 C1
(45) Certificate Issued: *May 12, 2015

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: GLOBAL COMMUNICATIONS, INC., Tallahassee, FL (US)

Reexamination Request:
No. 90/012,127, Feb. 3, 2012

Reexamination Certificate for:
Patent No.: 6,122,482
Issued: Sep. 19, 2000
Appl. No.: 09/001,484
Filed: Dec. 31, 1997

Certificate of Correction issued May 1, 2001

( * ) Notice: This patent is subject to a terminal disclaimer.

Related U.S. Application Data

(63) Continuation-in-part of application No. 08/838,677, filed on Apr. 9, 1997, now Pat. No. 5,805,975, which is a continuation-in-part of application No. 08/394,234, filed on Feb. 22, 1995, now abandoned.

(51) Int. Cl.
*H04H 1/00* (2006.01)
*H04B 7/185* (2006.01)
*H04N 7/10* (2006.01)
*H04N 7/20* (2006.01)
*H04H 40/90* (2008.01)

(52) U.S. Cl.
CPC ....... *H04H 40/90* (2013.01); *H04N 7/20* (2013.01)

(58) Field of Classification Search
None
See application file for complete search history.

(56) References Cited

To view the complete listing of prior art documents cited during the proceeding for Reexamination Control Number 90/012,127, please refer to the USPTO's public Patent Application Information Retrieval (PAIR) system under the Display References tab.

*Primary Examiner* — Karin Reichle

(57) ABSTRACT

The present invention provides a satellite broadcast receiving and distribution system that will permit for the transmission of vertical and horizontal or left-hand circular and right-hand circular polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to standard frequencies so as to permit for signals to travel via existing wiring which the present day amplifiers can transport in buildings, high-rises, hospitals, and the like so that satellite broadcasting can be viewed by numerous individuals by way of a single satellite antenna.

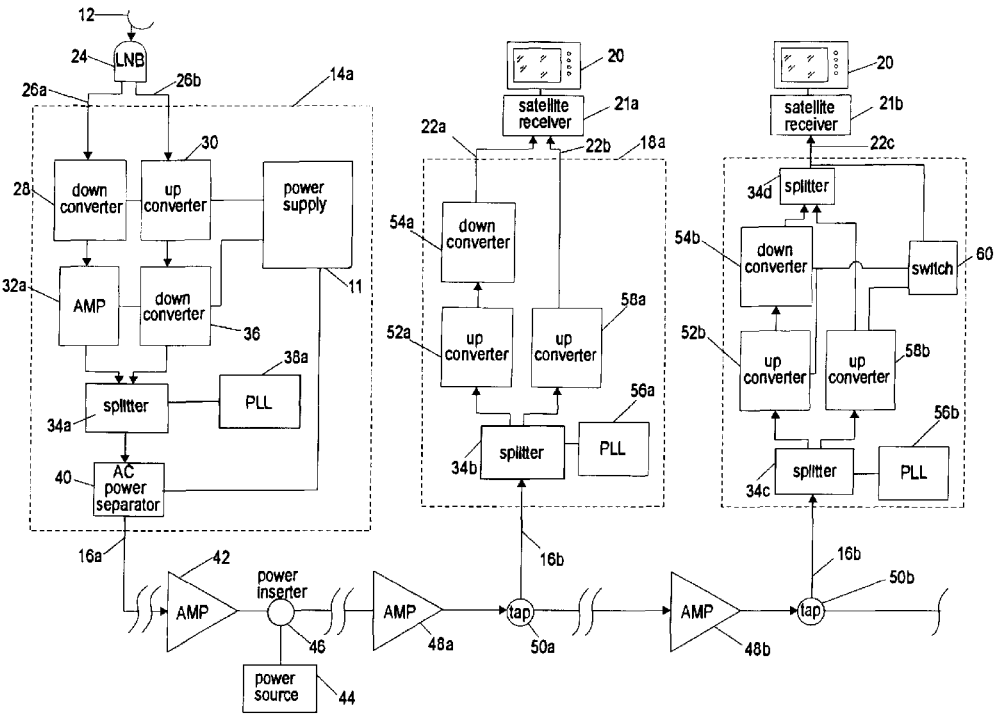

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7, 9, 11-21, 23-33 and 35-39 are cancelled.
Claims 8, 10, 22 and 34 were not reexamined.

\* \* \* \* \*